(12) United States Patent
Gessenhardt et al.

(10) Patent No.: US 11,976,604 B2
(45) Date of Patent: May 7, 2024

(54) METHOD FOR HEATING AN EXHAUST GAS AFTERTREATMENT COMPONENT, AND INTERNAL COMBUSTION ENGINE

(71) Applicant: Volkswagen Aktiengesellschaft, Wolfsburg (DE)

(72) Inventors: Christopher Gessenhardt, Weferlingen (DE); Sven Brannys, Lehrte (DE); Sergej Jakovlev, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 18/099,843

(22) Filed: Jan. 20, 2023

(65) Prior Publication Data

US 2023/0235712 A1 Jul. 27, 2023

(30) Foreign Application Priority Data

Jan. 21, 2022 (DE) ...................... 10 2022 101 345.6

(51) Int. Cl.
*F02D 41/06* (2006.01)
*F01N 3/20* (2006.01)
(Continued)

(52) U.S. Cl.
CPC ......... *F02D 41/024* (2013.01); *F01N 3/2006* (2013.01); *F02D 13/0246* (2013.01);
(Continued)

(58) Field of Classification Search
CPC ............. F02D 13/0215; F02D 13/0249; F02D 41/024; F02D 41/0245; F02D 41/0246; F02D 41/0255; F02D 2013/0292
See application file for complete search history.

(56) References Cited

U.S. PATENT DOCUMENTS 7,225,610 B2   6/2007   Kemmner et al.
8,000,875 B2   8/2011   Klein et al.
(Continued)

FOREIGN PATENT DOCUMENTS

DE    3506107 A1    8/1985
DE    69114490 T2   5/1996
(Continued)

OTHER PUBLICATIONS

Machine translation of WO-2015150451-A1, accessed Nov. 16, 2023. (Year: 2023).*

*Primary Examiner* — Jonathan R Matthias
(74) *Attorney, Agent, or Firm* — Muncy, Geissler, Olds & Lowe, P.C.

(57) ABSTRACT

A method for heating an exhaust gas aftertreatment component in an exhaust system of an internal combustion engine. At the combustion chamber, a fuel injector for injecting a fuel into the combustion chamber and a spark plug for igniting a flammable fuel-air mixture are arranged. The internal combustion engine has a valve lift curve switching mechanism, which allows for a shift and/or change of the opening times of the exhaust valve. The method includes: intake of fresh air into the combustion chamber, injection of a fuel into the combustion chamber, ignition of an ignitable fuel-air mixture in the combustion chamber when the piston is in a range of 10° KW to 30° KW after the upper ignition dead point, and opening of the exhaust valve when the piston is in a range of 55° KW to 95° KW after the upper ignition dead point.

14 Claims, 4 Drawing Sheets

(51) Int. Cl.
     *F02D 13/02*      (2006.01)
     *F02D 41/02*      (2006.01)
     *F02D 41/00*      (2006.01)

(52) U.S. Cl.
     CPC ....... *F02D 41/0255* (2013.01); *F02D 41/064* (2013.01); *F02D 2041/001* (2013.01); *F02D 2200/0802* (2013.01)

(56) References Cited

U.S. PATENT DOCUMENTS

| | | | |
|---|---|---|---|
| 9,810,167 B2 | 11/2017 | Watanabe et al. | |
| 11,421,614 B1 * | 8/2022 | Glugla | F02D 41/024 |
| 2017/0089284 A1 * | 3/2017 | Miura | F02D 41/26 |
| 2021/0054777 A1 * | 2/2021 | Blumreiter | F02D 41/3827 |

FOREIGN PATENT DOCUMENTS

| | | | | |
|---|---|---|---|---|
| DE | 10202437 A1 | 8/2003 | | |
| DE | 10236856 A1 | 2/2004 | | |
| DE | 102004031502 A1 | 3/2006 | | |
| DE | 102005015853 A1 | 10/2006 | | |
| DE | 112014000495 T5 | 11/2015 | | |
| DE | 102017208857 A1 | 12/2018 | | |
| EP | 0718475 A1 | 6/1996 | | |
| WO | WO-2015150451 A1 * | 10/2015 | ............ | F01N 9/002 |
| WO | WO2015150451 A1 | 10/2015 | | |

* cited by examiner

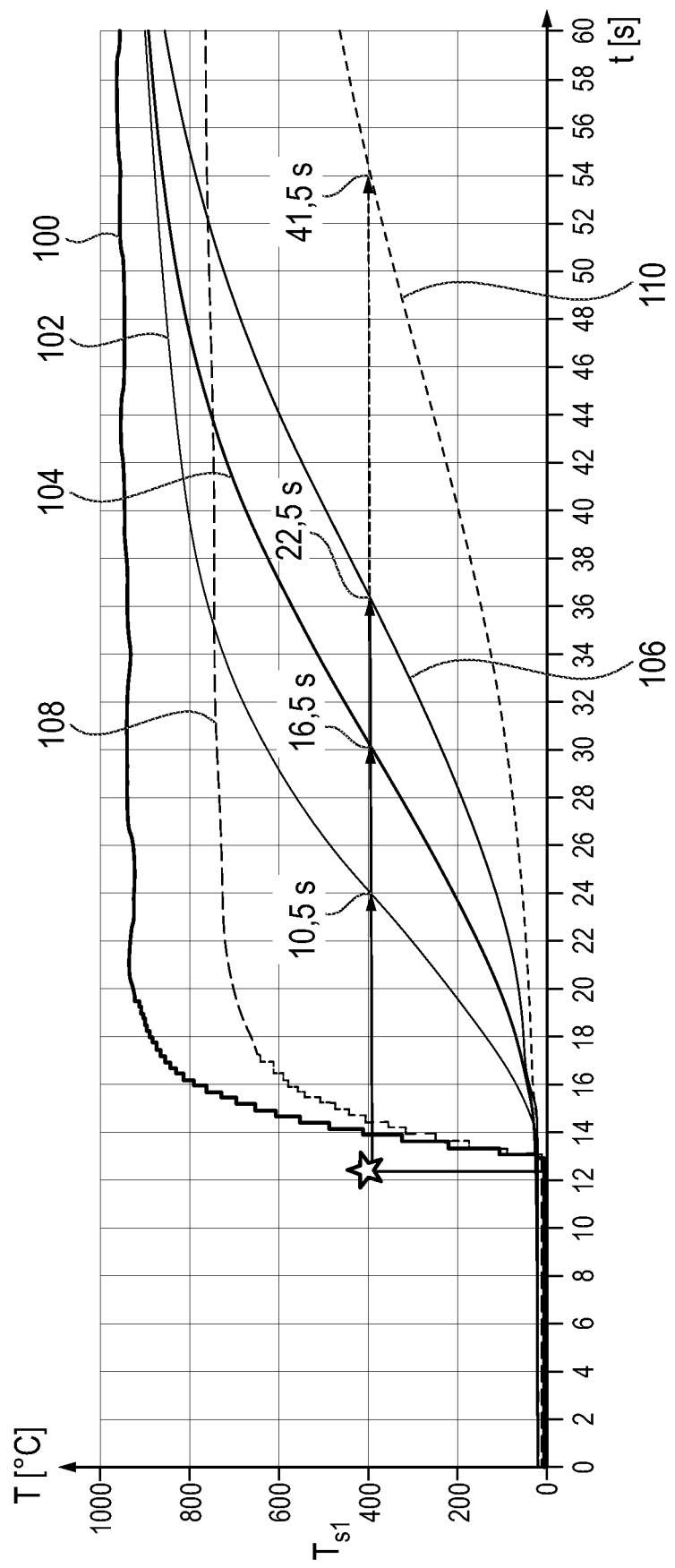

METHOD FOR HEATING AN EXHAUST GAS AFTERTREATMENT COMPONENT, AND INTERNAL COMBUSTION ENGINE

This nonprovisional application claims priority under 35 U.S.C. § 119(a) to German Patent Application No. 10 2022 101 345.6, which was filed in Germany on Jan. 21, 2022, and which is herein incorporated by reference.

BACKGROUND OF THE INVENTION

Field of the Invention

The present invention relates to a method for heating an exhaust gas aftertreatment component, in particular a three-way catalytic converter, in the exhaust system of an internal combustion engine, and an internal combustion engine with an exhaust system for carrying out such a method.

Description of the Background Art

In view of a further tightening of exhaust emission standards, for example with the introduction of the EU7 standard, it is necessary to significantly reduce cold-start emissions, which account for a large part of total emissions. In cold-start operation, i.e., immediately after starting the combustion engine, the exhaust gas aftertreatment components are usually not sufficiently warmed up to enable conversion of the raw emissions resulting from the combustion of the fuel. In particular, this leads to increased exhaust emissions in the cold start phase, which even if the raw emissions are completely converted after the cold start phase, lead to the limit values no longer being complied with. In order to avoid this, customer restrictions such as a driving ban or performance restriction immediately after the start of the internal combustion engine may be necessary in the case of state-of-the-art combustion engines with exhaust aftertreatment systems in order to ensure compliance with the EU7 emission limits under all required boundary conditions.

In order to meet the EU6 emission standard for gasoline engines, exhaust aftertreatment systems have become widespread, which include one or more three-way catalytic converters and a particulate filter. A three-way catalytic converter is a vehicle catalytic converter for the exhaust aftertreatment of internal combustion engines, in which carbon monoxide (CO), nitrogen oxides (NOx) and unburned hydrocarbons (HC) are converted into carbon dioxide ($CO_2$), molecular nitrogen ($N_2$) and water vapor ($H_2O$). The name of the catalytic converter is derived from the simultaneous conversion of these three air pollutants. For heating the exhaust gas aftertreatment components of the combustion engine, internal engine heating measures are known, which comprise adjusting the ignition angle towards "late", i.e., well after the upper dead point of the piston in the ignition cycle. This reduces the thermal efficiency of the combustion engine and increases the enthalpy of exhaust gases. The achievable reduction in efficiency is limited by the maximum late ignition angle due to the smooth running of the engine since the late displacement of the combustion is associated with poorer ignition and combustion boundary conditions. The known method is therefore not satisfactory in that it is accompanied by a deterioration of the ignition conditions due to the late ignition time, making the use of passive prechamber spark plugs more difficult. Furthermore, it is known to heat the three-way catalytic converter by an external heating medium, for example an electric heating element or an exhaust gas burner, so that the catalytic converter reaches its light-off temperature faster and is available faster after a cold start for effective conversion of limited emissions.

A disadvantage of the exhaust aftertreatment systems known from the prior art, however, is that the known internal engine heating measures are unlikely to be sufficient to meet the requirements of the EU7 emission standard under all operating conditions. Even with external heating agents, there is a short period in which the exhaust gas aftertreatment components have not yet reached their light-off temperature and the raw emissions are emitted unconverted into the environment. In addition, external heating agents lead to a significant increase in the price of the exhaust gas aftertreatment system.

From DE 35 06 107 A1 a method for exhaust gas aftertreatment of an internal combustion engine is known, whose exhaust gas is supplied to an exhaust gas catalytic converter after leaving the combustion chambers of the combustion engine. The opening time of the exhaust valves of the combustion engine is adjusted towards "early" in order to increase the input of heat into a cold catalytic converter.

DE 102 02 437 A1, which corresponds to US 2008/0208430, describes a method and a device as well as a computer program for controlling an internal combustion engine. In the calculation of actual variables and/or control variables of the engine control, a torque model is used. A correction of a base value determined under standard conditions is made. Furthermore, in order to further improve the accuracy of the model, the efficiency for the conversion of chemical energy into mechanical energy, with which the optimum torque value is corrected, is determined at least depending on a quantity characterizing the combustion center of gravity and on a quantity characterizing the opening time of a gas exchange valve on the exhaust side.

Publication DE 10 2017 208 857 A1 discloses a method for operating an internal combustion engine with at least one combustion chamber, wherein the combustion chamber is assigned an intake valve for controlled introduction of fresh gas into the combustion chamber, an exhaust valve for controlled output of exhaust gas from the combustion chamber, an injector for directly introducing fuel into the combustion chamber and an ignition device for igniting a fuel-fresh gas mixture in the combustion chamber. The intake valve and the exhaust valve are actuatable by means of a valve train which is designed such that at least for the exhaust valve an adjustment of the valve actuation is possible. The ignition of the fuel-fresh gas mixture is initiated by means of the ignition device at a defined ignition angle per cycle. A first operating state and a second operating state are provided, wherein in the first operating state, on the one hand, the exhaust valve is closed relatively early during an exhaust stroke of the working cycle as a result of a relatively short opening time as compared to the second operating state and/or the exhaust valve is opened a second time during the intake stroke following the exhaust stroke and, on the other hand, the ignition angle is set to relatively late as compared to the second operating mode.

From DE 691 14 490T2 a control device for an internal combustion engine is known, which further comprises a device for changing the engine power of the combustion engine by controlling the opening time of the intake valves. The control device can be used on carburetor, injection and turbocharged engines to optimize emission control. It is possible to use a single control device for different motor applications or a control unit with different control devices for different applications.

DE 11 2014 000 495 T5 describes a method for heating a catalytic converter in the exhaust system of an internal combustion engine. When the catalytic converter is in a non-activated state, as compared to the presence of the catalytic converter under the same engine operating condition in an activated state, the intake air volume is increased, and the ignition time is adjusted beyond an upper dead point of a compression stroke to "late". The ignition time is set in such a way that the late adjustment is carried out depending on the load requirement of the combustion engine. The valve opening start time of an exhaust valve is set so that, when the external load is lower than a predetermined reference load, the exhaust valve begins to open in a subsequent working cycle according to combustion of an air/fuel mixture ignited at the preceding ignition time before the cylinder internal pressure reaches a maximum value, wherein the cylinder internal pressure is based on the assumption that the exhaust valve is kept in a closed state of the valve.

From the publication U.S. Pat. No. 9,810,167 B2 a method for heating a catalytic converter in the exhaust system of an internal combustion engine is known. When the catalytic converter is in a non-activated state, the intake air volume is increased as compared to an activated state of the catalytic converter under the same engine operating conditions and the ignition time is delayed beyond the upper dead point of the compression stroke. The ignition time is adjusted such that its deceleration amount increases from the upper dead point when an external load causing a rotational resistance of the combustion engine decreases. A valve opening start time of an exhaust valve of an internal combustion engine is set such that when the external load is lower than a given reference load, the valve begins to open before the internal cylinder pressure reaches a peak.

SUMMARY OF THE INVENTION

It is therefore an object of the present invention to accelerate the heating of a catalytic converter in the exhaust system of the combustion engine and thus of ensuring a more efficient exhaust gas aftertreatment, in particular after a cold start of the combustion engine.

This object is achieved by a method for heating an exhaust gas aftertreatment component in the exhaust system of an internal combustion engine. The internal combustion engine has at least one combustion chamber, preferably three or four combustion chambers. Each combustion chamber is limited by a movable piston and comprises at least one intake port, which is connected to an intake tract of the combustion engine and can be closed by an intake valve, and at least one exhaust port which is connected to an exhaust system and can be closed by an exhaust valve. At each combustion chamber, a fuel injector for injecting a fuel into the combustion chamber and a spark plug are arranged, which is configured to ignite a flammable fuel-air mixture in the combustion chamber. The internal combustion engine comprises a valve lift curve switching mechanism, which allows for a shift and/or change of the opening times of the exhaust valve. The method includes: intake of fresh air into the combustion chamber, injection of a fuel into the combustion chamber, ignition of an ignitable fuel-air mixture in the combustion chamber when the piston is in a range of 10° KW after the upper ignition dead point to 30° KW after the upper ignition dead point, and opening of the exhaust valve when the piston is in a range of 55° KW to 95° KW, preferably in a range of 70° KW to 80° KW, after the upper ignition dead point.

A valve lift curve switching mechanism can be understood in this context as a device which allows for adjustment of the opening times of the exhaust valve of the internal combustion engine. This can be, in particular, a switchable cam with two different stroke contours or a camshaft adjuster, which adjusts the position of the camshaft relative to the crankshaft and thus adjusts the opening interval of the exhaust valve towards "early" or towards "late". The method enables significantly accelerated heating of an exhaust gas aftertreatment component, in particular a catalytic converter, after a cold start of the combustion engine. Thus, the emissions in the cold start phase of the combustion engine can be significantly reduced, whereby even particularly strict emission standards such as the planned EU7 standard can be reliably met.

By the features listed in the dependent claims, advantageous further developments and improvements of the method for heating the catalytic converter listed in the independent claim are possible.

In the examples of the invention it is provided that an exhaust camshaft of the internal combustion engine can have a switchable cam contour, in particular a switchable cam, wherein a first switching position of the switchable cam contour is configured to carry out the described method for accelerated heating of the exhaust gas aftertreatment component and a second switching position of the switchable cam contour is configured to provide a consumption-optimized normal operation of the combustion engine. This makes it possible to switch between a heating position in which a particularly rapid heating of the exhaust gas aftertreatment component is possible, and normal operation, in which a particularly fuel-efficient operation of the combustion engine is possible.

The first switching position can cause a longer opening time of the exhaust valve than the second switching position. In this context, a longer opening time can be understood to mean that the exhaust valve is open in the first switching position over a longer crank angle range than in the second switching position. At the same speed of the combustion engine in the first and second switching positions, this also corresponds to a longer opening time. Since with a simple shift of the opening times towards "early" the exhaust valve would close before the exhaust gas is pushed out into the exhaust system, and thus the burned gas in the combustion chamber would be compressed again, it is advantageous to extend the opening times as compared to normal operation when switching to a heating mode and with a correspondingly early opening of the exhaust valve. Therefore, a valve lift curve switching mechanism with two different cams, which realizes a longer opening stroke in heating mode than in normal operation, is preferred over a camshaft adjuster, which only changes the position of the opening times of the exhaust valve but leaves the duration unchanged.

The temperature of the exhaust gas aftertreatment component can be determined and the method is initiated when the determined temperature of the exhaust gas aftertreatment component is below a first threshold temperature. The first threshold temperature preferably corresponds to a light-off temperature of the exhaust gas aftertreatment component. The temperature of the exhaust gas aftertreatment component can be determined in particular by a temperature sensor on the exhaust gas aftertreatment component or by a calculation model in the control unit of the combustion engine. By determining a temperature of the exhaust gas aftertreatment component, it can be easily ascertained whether additional heating of the exhaust gas aftertreatment component is necessary during the start-up process of the combustion engine. This is advantageous because unnecessary heating phases, which are associated with increased fuel consumption, can be avoided.

An exhaust gas temperature of the internal combustion engine can be detected, and the method can be initiated if this exhaust gas temperature is below a second threshold temperature. Since the exhaust gas temperature can usually be determined more easily and quickly than the temperature of the exhaust gas aftertreatment component, but there is a relationship between the exhaust gas temperature and the temperature input into the exhaust gas aftertreatment component, the exhaust gas temperature can also be determined as an auxiliary variable to determine whether additional heating of the exhaust gas aftertreatment component by the inventive method is necessary.

The internal combustion engine can be designed as a turbocharged combustion engine loaded by means of an exhaust gas turbocharger, wherein an exhaust gas temperature upstream of the turbine of the exhaust gas turbocharger or a component temperature of the turbine of the exhaust gas turbocharger is determined, and the heating measures are reduced when the exhaust gas temperature upstream of the turbine is above a third threshold temperature or the component temperature of the turbine is above a fourth threshold temperature. The exhaust gas temperature or the component temperature of the turbine can be determined by a temperature sensor or a calculation model. By reducing the heating power, it can be prevented that a critical limit temperature of the exhaust gas turbocharger is exceeded and permanent thermal damage to the exhaust gas turbocharger occurs.

The opening times of the exhaust valve can be shifted by the valve lift curve switching mechanism towards "late" when the exhaust gas aftertreatment component has reached a defined minimum temperature. By shifting the opening times towards "late" fuel consumption can be reduced when the exhaust gas aftertreatment component has reached its operating temperature. In particular, the opening times are shifted towards "late" in combination with an adjustment of the ignition angle towards "early" in order to increase the thermal efficiency of the combustion engine.

The method can be carried out at a speed of the internal combustion engine of a maximum of 2500 rpm, preferably at a maximum of 1250 rpm, in particular at an idle speed or an increased idle speed. In order to heat up the exhaust gas aftertreatment component as quickly as possible, it is necessary to introduce a corresponding amount of heat into the exhaust system, especially when idling and at low partial load.

The exhaust valve can be closed when carrying out the method at an angular range of 300° KW to 380° KW after the upper ignition dead point. This ensures that a large part of the exhaust gas is pushed out into the exhaust system and that there is enough time for a charge exchange.

Another aspect of the invention relates to an internal combustion engine having at least one combustion chamber, preferably three or more combustion chambers. Each combustion chamber is limited by a movable piston. At each combustion chamber at least one intake port and at least one exhaust port is provided, which connect the combustion chamber with an intake tract or an exhaust system of the combustion engine. Each intake port is closable by an intake valve and each exhaust port by an exhaust valve. At each combustion chamber, a fuel injector for injecting a fuel into the combustion chamber and a spark plug for igniting an ignitable fuel-air mixture are disposed. The internal combustion engine also has a valve lift curve switching mechanism, which allows for a shift and/or extension of the opening times of the exhaust valve. An exhaust gas aftertreatment component is arranged in the exhaust system. The combustion engine is operatively connected to a control unit which is configured to carry out a method according to the invention for heating the exhaust gas aftertreatment component when a machine-readable program code stored in a memory unit of the control unit is executed by a computing unit of the control unit.

Such an internal combustion engine makes it possible, even without external heating measures such as an exhaust gas burner or an electrically heated catalytic converter, to raise the temperature of an exhaust gas aftertreatment component in a short time interval to a temperature at which an efficient conversion of the pollutants in the exhaust gas stream of the combustion engine is possible.

The internal combustion engine can be designed as a direct-injection gasoline engine charged by means of an exhaust gas turbocharger. Due to their high thermal efficiency, direct-injection gasoline engines are particularly critical when it comes to rapid heating of the exhaust gas aftertreatment component. This challenge is further increased in the case of direct-injection gasoline engines charged by means of an exhaust gas turbocharger, since the turbine of the exhaust gas turbocharger must first be heated before heating the exhaust gas aftertreatment component. In this case, the proposed method for heating an exhaust gas aftertreatment component, in particular in a direct-injection gasoline engine charged by means of an exhaust gas turbocharger, is particularly advantageous in order to bring about a strong deterioration of the thermal efficiency for a limited time and to be able to introduce a corresponding amount of heat into the exhaust system in the shortest possible time.

The spark plug can be designed as a hook spark plug. Hook spark plugs are structurally simpler and more cost-effective to manufacture than prechamber spark plugs. However, prechamber spark plugs offer an advantage in the definition of a small ignition chamber and in the propagation of the flame front in the combustion chamber. The inventive method is designed such that with a simple hook spark plug the fuel-air mixture can be reliably ignited in the combustion chamber and the greatest possible heat input into the exhaust system for heating the exhaust gas aftertreatment component is ensured.

The exhaust gas aftertreatment component can be a three-way catalytic converter or a four-way catalytic converter. The conversion of the pollutants in a direct-injection gasoline engine is usually carried out by one or more three-way catalytic converter(s) and a particulate filter downstream of the three-way catalytic converter. In order to comply with the emission limits, it is necessary to heat at least one three-way catalytic converter to its light-off temperature as quickly as possible.

The three-way catalytic converter or the four-way catalytic converter can be arranged towards flow of an exhaust gas stream of the combustion engine through the exhaust system as the first emission-reducing exhaust gas aftertreatment component in a position close to the engine in the exhaust system. In this context, a position close to the engine is a position in the exhaust system with an exhaust gas yardage of not more than 80 cm, preferably a maximum of 50 cm, from an exhaust of the internal combustion engine to the intake of the exhaust gas aftertreatment component.

The valve lift curve switching mechanism can comprise a switchable cam with which the opening times of the exhaust valve in a first switching state of the valve lift curve switching mechanism enable an early opening of the exhaust valve for heating the exhaust gas aftertreatment component and in a second switching state, enable a late opening of the exhaust valve with the aim of efficiency-optimized combustion in the combustion chamber.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 6 shows temperature curves at various points in the exhaust system in an inventive method for heating an exhaust gas aftertreatment component and in a conventional method for heating an exhaust gas aftertreatment component.

DETAILED DESCRIPTION

Figure 1:
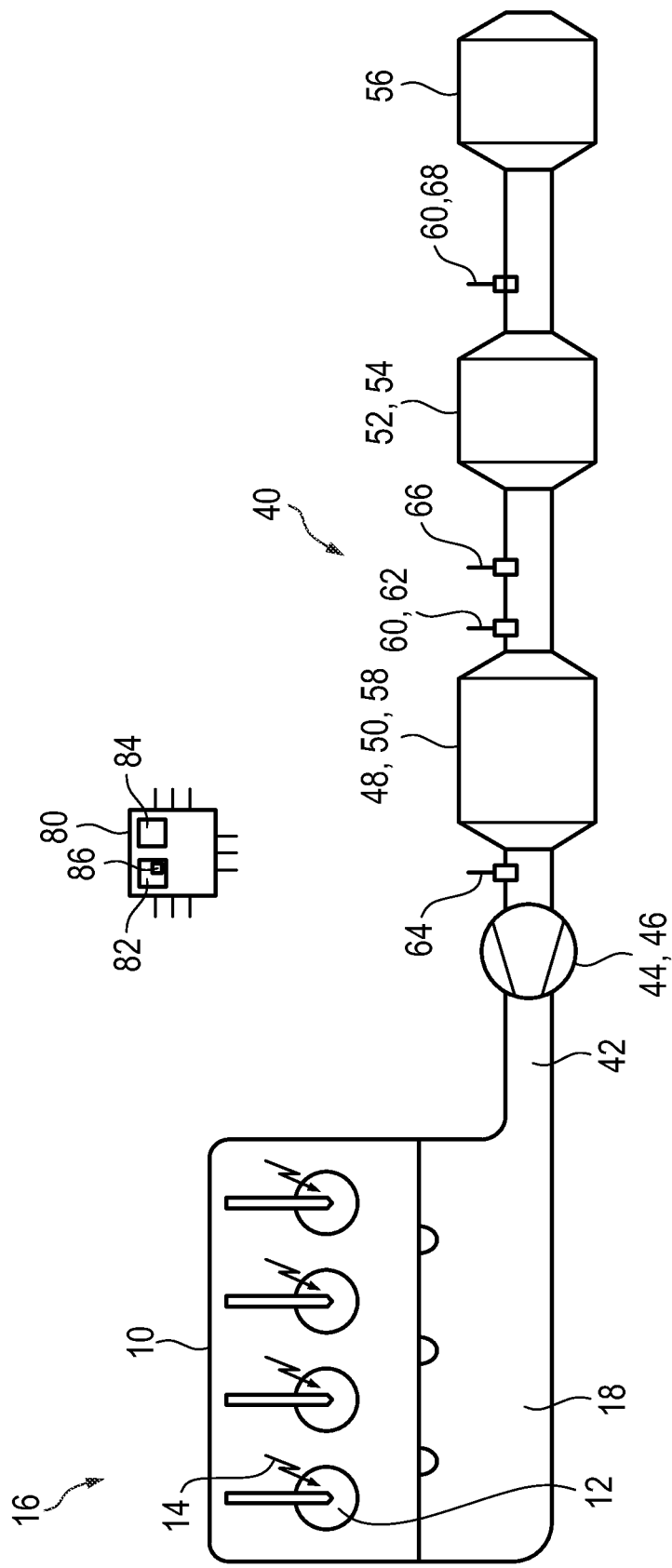
FIG. 1 shows an internal combustion engine with an exhaust system for carrying out a method according to the invention for heating a catalytic converter in a schematic representation.

FIG. 1 shows an internal combustion engine 10 having at least one combustion chamber 12, preferably as shown in FIG. 1 with at least three combustion chambers 12. The combustion engine 10 is designed as a direct-injection gasoline engine. For this purpose, a spark plug 14, preferably a hook spark plug 34, for igniting an ignitable fuel-air mixture and a fuel injector 30 for injecting a fuel into the respective combustion chamber 12 are arranged at each combustion chamber 12. Each combustion chamber 12 is connected via at least one intake port 16 to an unspecified intake tract and via at least one exhaust port 18 to an exhaust system 40. A fluidic connection from the intake tract into the combustion chamber 12 can be closed by an intake valve 20. A fluidic connection from the combustion chamber 12 to the exhaust system 40 can be closed by an exhaust valve 22.

The exhaust system 40 comprises an exhaust duct 42, in which in the flow direction of an exhaust gas stream of the internal combustion engine 10 through the exhaust system 40, a turbine 46 of an exhaust gas turbocharger 44, and downstream of the turbine 46, at least one exhaust gas aftertreatment component 48 are arranged. Preferably, as shown in FIG. 1, a first three-way catalytic converter 50 downstream of the turbine and, downstream of the first three-way catalytic converter 50, at least one further exhaust gas aftertreatment component 52, in particular a second three-way catalytic converter 54, an oxidation catalytic converter 58 and/or a particulate filter 56 are arranged. The second three-way catalytic converter 54 and the particulate filter 56 may also be combined in one component as a so-called four-way catalytic converter. Further, one or more exhaust gas sensors 60 may be arranged in the exhaust system 40 for monitoring the functionality of the exhaust gas aftertreatment component 48, 52. A first lambda sensor 64 is preferably arranged upstream of the first three-way catalytic converter 50, and a second lambda sensor 66 and a temperature sensor 62, and optionally a pollutant sensor 68, are preferably arranged downstream of the first three-way catalytic converter 50 in the exhaust system 40.

The internal combustion engine 10 is operatively connected to a control unit 80, which comprises a memory unit 82 and a computing unit 84. In the memory unit 82, one or more machine-readable program codes 86 for controlling the internal combustion engine 10, in particular for controlling the ignition time of the spark plug 14, the injection quantity and the injection timing of the fuel injector 30 and for controlling the opening times of the valves 20, 22 are stored.

Figure 2:
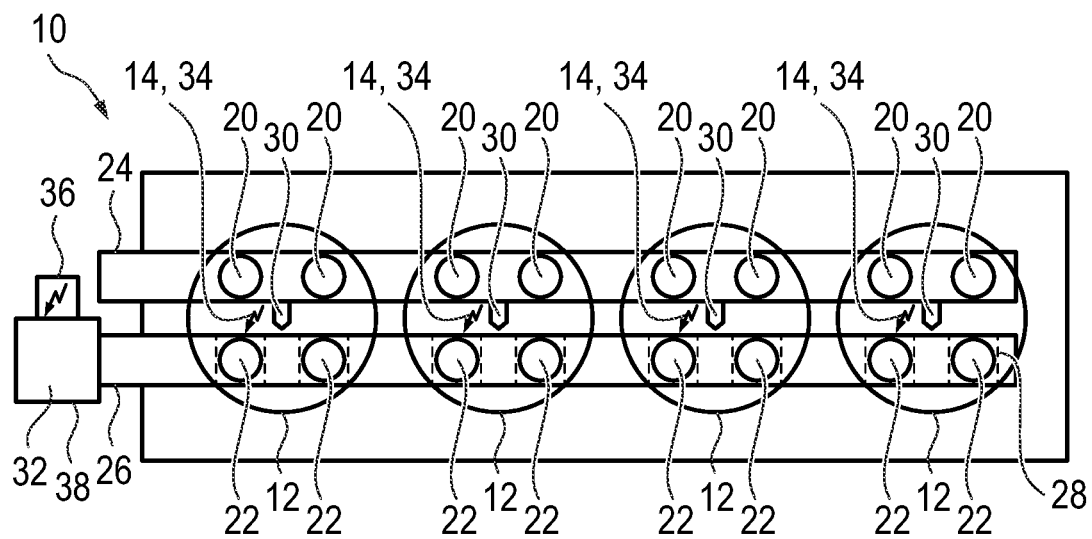
FIG. 2 shows a further schematic representation of an internal combustion engine for carrying out a method according to the invention for heating a catalytic converter.

FIG. 2 shows the combustion engine 10 in a further schematic representation. The opening times of the intake valves 20 are controlled by an intake camshaft 24. The opening times of the exhaust valves 22 are controlled by an exhaust camshaft 26. In this case, a valve lift curve switching mechanism 38 is provided on the exhaust camshaft 26, with which a switchable cam contour 28, which can be activated via a switching mechanism 36, can switch between a first opening curve of the exhaust valves 22 and a second opening curve of the exhaust valves 22.

Figure 3:
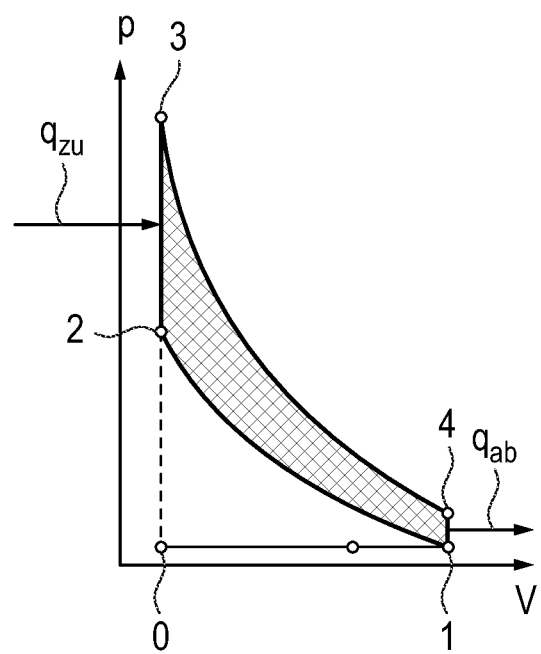
FIG. 3 shows an ideal Otto cycle.
Figure 4:
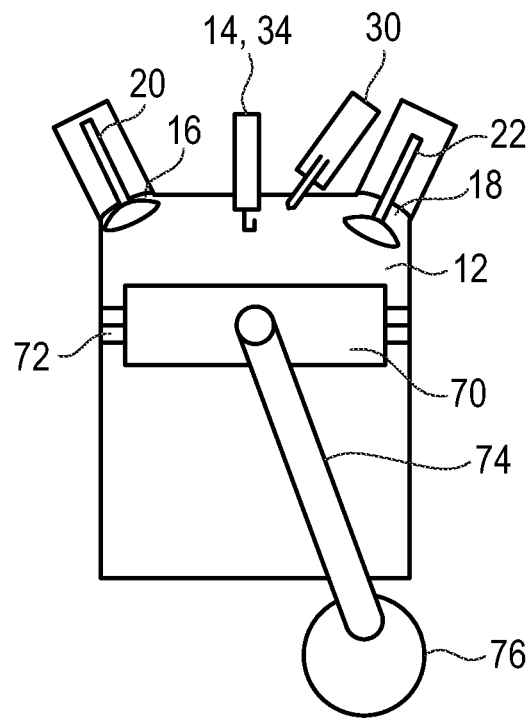
FIG. 4 shows a simplified representation of a combustion chamber of an internal combustion engine for carrying out such a cycle process.

FIG. 3 schematically shows an ideal Otto cycle, which provides a theoretical basis for the inventive method. FIG. 4 schematically shows a combustion chamber 12 of an internal combustion engine 10 with a piston 70, which is connected via a connecting rod 74 to a crankshaft 76 for carrying out such an Otto cycle. In this case, the combustion chamber 12 is sealed by piston rings 72, which seal a gap between the piston and a cylinder wall of the combustion chamber 12 and rest against the cylinder wall. Furthermore, in FIG. 4, the compression volume $V_K$ and the displacement $V_H$ are shown. In such an ideal process, no dissipation losses, mechanical friction losses or the like are taken into account. Furthermore, the working gas has the same properties over the entire cycle and flow losses are not taken into account. Furthermore, no mixing of charge mixture with exhaust gas is assumed.

Preferably, the invention relates to a method for a direct-injection four-stroke gasoline engine charged by means of an exhaust gas turbocharger 44. Each stroke consists of a piston stroke of the piston 70 or half a crankshaft revolution. In the four-stroke gasoline engine, the state changes can be assigned to the working cycles. This is described below using FIG. 3:

The first stroke, the intake stroke, comprises the intake in which the piston 70 moves downwards in FIG. 4 and the combustion chamber 12 fills with fresh air. This corresponds to the connecting line between points 0 and 1 in the diagram.

The second stroke, the compression stroke, comprises the compression of the combustion chamber charge, wherein the piston 70 moves to the left in FIG. 4. This corresponds in the diagram to the isentropic connecting line between points 1 and 2 and the isochoric heat input $q_{zu}$ is carried out by ignition and burning of the gas charge, which corresponds to the connecting line between points 2 and 3 (constant-volume combustion).

The third stroke, the expansion or working stroke, comprises the isentropic expansion, wherein the piston 70 is moved down again as a result of exothermic combustion. This corresponds to the connecting line between points 3 and 4 in the diagram.

The fourth stroke is also referred to as the exhaust stroke (heat dissipation), wherein the piston 70 moves again to the left by opening the exhaust valve 22, the exhaust gases in the lower dead point expand outwards without further output (connecting line between points 4 and 1) and the rest of the exhaust gas is pushed outwards by the piston stroke (connecting line between points 1 and 0). The heat $q_{Ab}$ contained in the exhaust gas is released into the environment. The ideal process does not take into account that the residual amount in the compression chamber does not reach the ambient condition.

Figure 5:
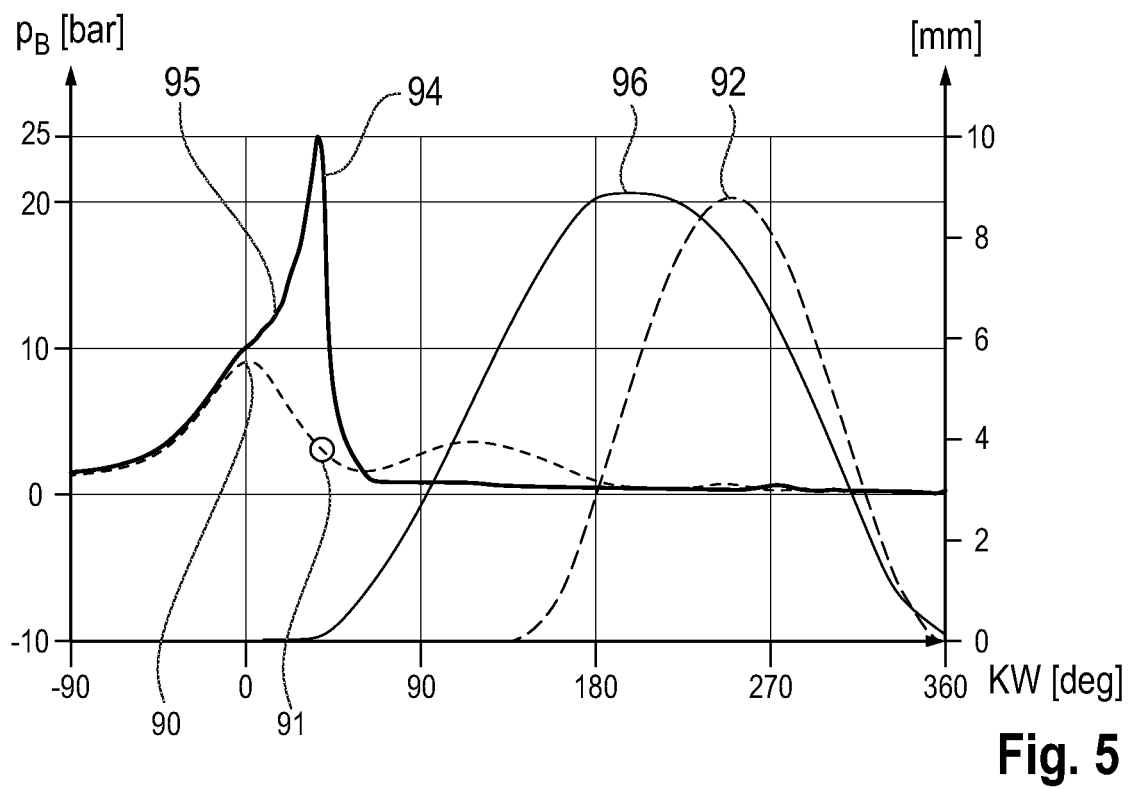
FIG. 5 shows a curve of combustion chamber pressure and exhaust valve lift in the inventive implementation of a preferred method for heating an exhaust gas aftertreatment component.

FIG. 5 now shows the curve of combustion chamber pressure and exhaust valve stroke according to a preferred embodiment of the invention and a conventional method for catalytic converter heating.

The curve with the reference sign 90 here shows the curve of the combustion chamber pressure and the reference sign 92 the curve of the valve lift of the exhaust valve 12 in the conventional catalytic converter heating operation, which is known from the prior art.

Furthermore, the curve with the reference sign 94 shows the curve of the combustion chamber pressure in the catalytic converter heating operation according to the invention, while the reference sign 96 is directed to a curve which describes the curve of the valve lift of the exhaust valve 12 in the catalytic converter heating operation according to the invention.

In the known method for heating a catalytic converter of a gasoline internal combustion engine, the ignition 91 of the gas charge in one of the cylinders takes place relatively late after the upper ignition dead point, for example 40° KW after the upper ignition dead point, while the exhaust opening of the exhaust valve 22 of the exhaust of the combustion chamber 12 also takes place late, for example 155° KW-175° KW after the upper ignition dead point.

In the inventive method for heating an exhaust gas aftertreatment component 48, in particular a three-way catalytic converter 50 in the exhaust system 40 of a direct-injection gas engine 10 with at least one combustion chamber 12, the ignition 95 of the gas charge in the combustion chamber 12 takes place in an angular range of 10° KW after the upper ignition dead point up to 30° KW after the upper ignition dead point, while the opening of the exhaust valve 22 takes place in an angular range of 55° KW to 95° KW after the upper ignition dead point.

A representation of the early exhaust opening can be made here by the valve lift curve switching mechanism 38, in particular by a switchable cam contour 28.

Alternatively, switching between heating mode and normal operation can be carried out by an exhaust camshaft phase adjuster with a very wide adjustment range, wherein an adjustment range of at least 120° KW is assumed, and a cam contour which is also used outside the heating mode.

Preferably, the exhaust camshaft 26 has a switchable cam contour 28, wherein the cam contour, which realizes the heating operation, has a larger opening range than the cam contour for normal operation. Preferably, the cam contour for the heating operation comprises an exhaust valve elevation curve having a control width of 250° to 290° KW, preferably of about 270° KW, based on a valve lift of at least 1 mm.

The embodiment with a switchable cam contour 28 and a control width of 250° to 290° KW is particularly preferred since this allows for configuring the exhaust port and the closing time at the optimal operating point. Compared to the embodiment with a camshaft adjuster with a large adjustment range, the disadvantages associated therewith can be prevented in such a way that this embodiment has a high residual gas rate in the combustion chamber 12 due to the necessarily very early closure of the exhaust, which is accompanied by a reduced air flow rate and suboptimal ignition conditions in the combustion chamber 12.

The inventive method results in a significantly increased exhaust gas enthalpy. In order to be able to ensure a safe ignition of the fuel-air mixture located in the combustion chamber 12 even at such a late ignition time, the use of a hook spark plug 34 is preferred over a prechamber spark plug, since a prechamber spark plug may not ensure ignition of the fuel-air mixture at the described opening and ignition times.

FIG. 6 shows temperature curves in the exhaust system in a method according to the invention for heating the exhaust gas aftertreatment component and in a conventional method for heating an exhaust gas aftertreatment component. In this case, the curve 100 shows the temporal curve of an exhaust gas temperature of the combustion engine 10 before entering the turbine 46 of the exhaust gas turbocharger 44 in an inventive method for heating an exhaust gas aftertreatment component 48. Curve 102 shows the temporal curve of a temperature at the intake of a three-way catalytic converter 50 close to the engine. Curve 104 shows the temporal temperature curve in the center of the close-coupled three-way catalytic converter 50 and curve 106 at the exhaust of the close-coupled three-way catalytic converter 50. The curve 108 represents the temporal curve of an exhaust gas temperature before entering the turbine 46 of the exhaust gas turbocharger 44 in a conventional inner-engine heating method known from the prior art for heating an exhaust gas aftertreatment component. Curve 110 shows the temporal temperature curve in the center of the close-coupled three-way catalytic converter 50 in a conventional inner-engine heating process. From a comparison of curves 104 and 110 it can be seen that the center of the three-way catalytic converter 50 reaches a first threshold temperature $T_{S1}$ much faster in the inventive method than in the conventional inner-engine heating process.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for heating an exhaust gas aftertreatment component in an exhaust system of an internal combustion engine having at least one combustion chamber, wherein the combustion chamber is limited by a movable piston and has an intake port which is connected to an intake tract of the internal combustion engine and is closable by an intake valve, and has an exhaust port, which is connected to an exhaust system and is closable by an exhaust valve, wherein a fuel injector for injecting a fuel into the combustion chamber is arranged on the combustion chamber, and with a spark plug, which is configured to ignite a flammable fuel-air mixture in the combustion chamber, and with a valve lift curve switching mechanism, which allows for a shift and/or change of opening times of the exhaust valve, the method comprising:
- intake of fresh air into the combustion chamber;
- injection of the fuel into the combustion chamber;
- ignition of the flammable fuel-air mixture in the combustion chamber when the piston is in a range of 10° KW to 30° KW after the upper ignition dead point; and
- opening of the exhaust valve when the piston is in a range of 55° KW to 95° KW after the upper ignition dead point,
- wherein an exhaust camshaft comprises a switchable cam contour, wherein a first switching position of the switchable cam contour is configured to carry out the method and a second switching position of the switchable cam contour is configured to realize a consumption-optimized normal operation of the combustion engine, and
- wherein the first switching position causes a longer opening time of the exhaust valve than the second switching position.

2. The method according to claim 1, wherein the switchable cam contour is a switchable cam.

3. The method according to claim 1, wherein a temperature of the exhaust gas aftertreatment component is determined and the method is initiated when the temperature of the exhaust gas aftertreatment component is below a first threshold temperature.

4. The method according to claim 1, wherein the internal combustion engine is designed as an internal combustion engine turbocharged by of an exhaust gas turbocharger, wherein an exhaust gas temperature upstream of a turbine of the exhaust gas turbocharger or a component temperature of the turbine of the exhaust gas turbocharger is determined and the heating is reduced if the exhaust gas temperature upstream of the turbine is above a first threshold temperature or the component temperature of the turbine is above a second threshold temperature.

5. The method according to claim 1, wherein opening times of the exhaust valve are shifted by the valve lift curve switching mechanism towards "late" when the exhaust gas aftertreatment component has reached a defined minimum temperature.

6. The method according to claim 1, wherein the method is carried out at a speed of the internal combustion engine of a maximum of 2500 rpm.

7. The method according to claim 1, wherein the exhaust valve is closed when carrying out the method at an angular range of 300° KW after the upper ignition dead point to 380° KW after the upper ignition dead point.

8. The method according to claim 1, wherein in the first switching position, the switchable cam contour has an exhaust valve elevation curve having a control width of 250° KW to 290° KW and wherein the exhaust valve is lifted at least 1 mm from a seat of the exhaust valve over the control width.

9. An internal combustion engine comprising:
- at least one combustion chamber limited by a movable piston;
- an intake port which is connected to an intake tract of the internal combustion engine and is closable by an intake valve;
- an exhaust port which is connected to an exhaust system and is closable by an exhaust valve;
- a fuel injector arranged for injecting a fuel into the combustion chamber is arranged on the combustion chamber;
- a spark plug configured to ignite a flammable fuel-air mixture in the combustion chamber;
- a valve lift curve switching mechanism, which allows for a shift and/or change of opening times of the exhaust valve;
- an exhaust gas aftertreatment component arranged in the exhaust system; and
- a control unit, which is configured to carry out the method according to claim 1 when a machine-readable program code stored in a memory unit of the control unit is executed by a computing unit of the control unit.

10. The internal combustion engine according to claim 9, wherein the internal combustion engine is a direct-injection gasoline engine turbocharged by an exhaust gas turbocharger.

11. The internal combustion engine according to claim 9, wherein the spark plug is a hook spark plug.

12. The internal combustion engine according to claim 9, wherein the exhaust gas aftertreatment component is a three-way catalytic converter.

13. The internal combustion engine according to claim 12, wherein the three-way catalytic converter is arranged in a flow direction of an exhaust gas stream of the internal combustion engine as a first emission-reducing exhaust gas aftertreatment component in the exhaust system in a position close to the internal combustion engine.

14. The internal combustion engine according to claim 9, wherein the valve lift curve switching mechanism has a switchable cam, with which the opening times of the exhaust valve in a first switching state of the valve lift curve switching mechanism allow for an early opening of the exhaust valve for heating the exhaust gas aftertreatment component, and in a second switching state, allow for a late opening of the exhaust valve with for an efficiency-optimized combustion in the combustion chamber.

* * * * *